United States Patent Office 3,801,486
Patented Apr. 2, 1974

3,801,486
CHLORIDE SENSING ELECTRODE
Warren M. Wise, Corning, N.Y., assignor to Corning Glass Works, Corning, N.Y.
Filed May 18, 1972, Ser. No. 254,417
Int. Cl. G01n 27/46
U.S. Cl. 204—195 L
3 Claims

ABSTRACT OF THE DISCLOSURE

Liquid organic ion exchange electrode having a 10:1 selectivity for chloride over bicarbonate. The chloride sensing phase of the electrode comprises a high molecular weight quaternary ammonium salt dissolved in at least one solvent selected from the group consisting of 1-phenyl-1-heptanol and 2,2,2, trifluoroethyldeconate.

BACKGROUND OF THE INVENTION

Field of the invention

This invention is in the field of electrodes which can measure the concentration of ions in an aqueous solution. Such ion sensitive electrodes are well known and have been designed to measure the concentration of such cations as $H^+$, $Na^+$, $K^+$, $Ag^+$, $Cu^{++}$, and $Ca^{+2}$ as well as anions such as $F^-$, $Cl^-$, $Br^-$, $I^-$, and $NO_3^-$. More specifically, the present invention is in the field of ion selective electrodes having a liquid organic ion sensing phase which can sense one or more specific ions in preference to others. The electrodes housing such organic sensing phases are commonly referred to as liquid organic ion-exchange electrodes or simply, sensor electrodes.

In using sensor electrodes to measure ion concentrations, two electrodes are used—the sensor electrode and a reference electrode. Two electrodes are typically connected electrically to a high impedence potentiometer or electrometer and then immersed in an aqueous test solution. Depending on the construction of the sensor electrode, and the extent of ionic activity in a given test solution, an electrochemical cell may develop. The potential of this cell can be read on the electrometer. Since EMF is a function of ion activity, and ion activity can be related to ion concentration, the potential reading can be translated into a measure of ion concentration in a given test solution.

The preference of a sensor electrode for measuring the activity of certain ions over others is referred to as the selectivity of the sensor electrode. This selectivity is governed by the tendency of the ion sensitive portion to sense given test ions over other ions at the same concentration. Selectivity is generally determined by the composition of the sensor phase portion of the electrode. Thus, if the sensor phase (or sensitive portion) of the sensor electrode is of such a composition as to sense more readily the test ion activity, the EMF noted on the electrometer will be mainly attributable to the test ion acitvity. This, in turn, provides an indication of test ion concentration.

The dependence of potential change on the activity of the specific ion to be measured follows a specific equation for a given concentration range and is related to the physiochemical characteristics of the electrode. The equation shows:

$$E = E^\circ + \frac{RT}{nF} Ln A = E^\circ + \frac{0.059}{n} \log A \ (25^\circ \text{ C.})$$

where E is the electrode potential, $E^\circ$ is a constant, $n$ is the ion charge ($\pm$) and A is the activity of the specific ion in solution.

It is apparent from the equation that a change in activity (A) equivalent to one order of magnitude causes 59 mv. potential change when the ion is univalent and about 30 mv. and 20 mv., respectively, when the ion is bivalent or trivalent. Thus, since a change in EMF represents a change in test ion activity, and since test ion activity can be related to test ion concentration, the change in EMF can be used to indicate test ion concentration.

In practice, the sensitive portion of the sensor electrode is designed in such a way as to limit the manner in which contact is made with the aqueous test solution. Care must be taken to assure that the sensitive portion of the electrode can be brought into contact with an aqueous test solution to provide an interface for sensor-test solution interaction while at the same time minimizing or preventing leakage of the sensor phase into the aqueous test solution. The useful life span of a given sensor is very dependent on how well the sensor material can be prevented from substantially leaving the sensor electrode and undesirably mixing with test solution. There are various methods for preventing such leakage and they are described under the heading prior art.

Prior art

It has been known for some time that the amine salts and aliphatic quaternary salts, dissolved in an appropriate solvent, can be used for preparing the ion sensitive portions of liquid anion sensor electrodes. A detailed description of one of the earliest disclosures of such electrodes can be found in U.S. Pat. No. 3,429,785, assigned to the same assignee as the present invention. In that patent, there are disclosed electrodes for determining the concentration of various ionic species in aqueous solutions wherein the sensing portion of the electrode is a liquid-organic phase containing an organic ion-exchange material capable of exchanging ions with the aqueous solution. The organic phase is described as being substantially immiscible with the aqueous solution. This property of of immiscibility minimizes sensor to test solution leakage.

Other methods of minimizing such leakage are disclosed in U.S. Pat. No. 3,448,032 asigned to the present assignee, and U.S. Pat. No. 3,438,886. Both of the above patents describe methods for minimizing sensor leakage by using various porous membrane materials or treated membrane materials to provide an organophilic-hydrophobic barrier between the sensor phase and an aqueous test solution.

Examples of other electrodes utilizing a liquid organic ion-exchange sensor phase which is sensitive to specific ions in solution can be found in patent application Ser. No. 107,138, now U.S. Pat. No. 3,671,413 (which measures nitrate ion concentration) and patent application Ser. No. 222,023, now U.S. Pat. No. 3,723,281 (bicarbonate concentration), both of which are assigned to the present assignee.

Electrodes which are particularly sensitive to chloride ions are disclosed in the above U.S. Pat. No. 3,429,785. Because of the disclosure in that patent, it has been found possible to prepare a chloride sensing electrode which can be used in the presence of bicarbonate ions. One such electrode, which is commercially available, consists of a sensor phase of tri-n-octylpropylammonium chloride dissolved in decanol. With that electrode, the selectivity for chloride over bicarbonate is about 4:1 in 0.1 molar solutions. The selectivity results in a change in the EMF of the electrode of about 4 mv. when there is a shift in the bicarbonate concentration of a chloride solution from 10 to 50 milliequivalents of bicarbonate per liter. Thus, the operability of this electrode can be somewhat limited in test solutions which are susceptible to the so-called "chloride shift."

"Chloride shift" designates an apparent change in chloride concentration which results when bicarbonate concentration of the same test solution varies. For further information on the effect of varying bicarbonate concentrations on an electrochemical determination of chloride concentration, see Oser, B. L., "Hawk's Physiological Chemistry," 14th ed., McGraw-Hill Book Co., p. 937–940 (1965).

In many cases, the variation of bicarbonate concentration in a test solution is uncontrollable. Thus, when chloride concentration is being measured in a test solution subject to chloride shift due to varying bicarbonate concentrations, a slightly inaccurate chloride reading is obtained. The degree of inaccuracy will depend on the selectivity of the electrode for chloride over bicarbonate. A higher selectivity will tend to minimize the inaccuracy.

For example, if a 4:1 selectivity for chloride over bicarbonate is used in the equation discussed under Background of the Invention, a change of 2.4 mv. is calculated in comparison to the approximate 2.1 mv. observed change. Thus, any change in bicarbonate concentration in a solution containing chloride ions whose concentration is to be measured, can tend to introduce measurement errors for the chloride regardless of the source of the bicarbonate concentration change. The problems associated with making measurements of chloride concentration in solutions which are subject to the so-called "chloride shift" are especially apparent when the electrode is used to measure chloride concentrations in test solutions which are exposed to the air. Also, such changes are noted when the electrode is first used in measuring chloride in aqueous solutions, and then used to measure chloride concentrations in blood, serum, or vice versa.

Because of the errors which can be produced because of changing bicarbonate concentrations, attempts have been made to find a better liquid organic ion-exchange sensor phase for chloride ions which will exhibit a higher selectivity for chloride in the presence of bicarbonate. Quite surprisingly, I have now found that, by changing the solvent system used for the chloride ion sensing salt, chloride sensing electrodes can be prepared which demonstrate a considerably higher selectivity for chloride in the presence of bicarbonate.

SUMMARY OF THE INVENTION

I have been able to prepare a chloride sensing electrode which demonstrates a 10:1 selectivity for chloride in the presence of bicarbonate. With this electrode, errors introduced because of changing bicarbonate concentrations have been found to be generally less than 0.5 millivolts. Thus, the electrode is capable of measuring chloride ion concentrations in the presence of varying amounts of bicarbonate ions without the necessity of making undue background corrections or calculations. Specifically, I have found that the above electrode can be made by using a chloride sensing salt, such as one of the conventional chloride sensing quaternary ammonium sensing salts, dissolved in a new solvent system.

My electrode for measuring the concentration of chloride ions in the presence of varying amounts of bicarbonate in aqueous solution comprises in combination a chloride sensing phase comprising a quaternary ammonium salt such as tri-n-octylpropylammonium chloride dissolved in a solvent system comprising at least one solvent selected from the group consisting of 1-phenyl-1-heptanol and 2,2,2-trifluoroethyldeconate. My preferred sensing phase comprises a solution of about 10% of tri-n-octylpropylammonium chloride (wt./v.) dissolved in 1-phenyl-1-heptanol.

SPECIFIC EMBODIMENTS

Figure 1:
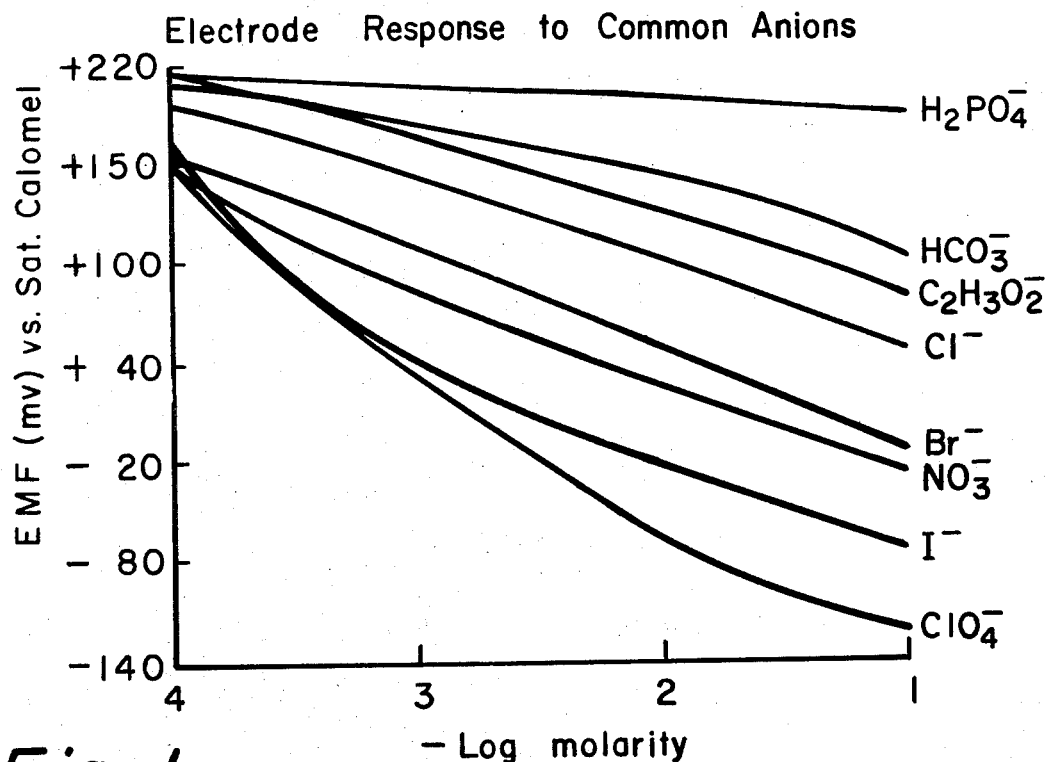
FIG. 1 shows response curves for my preferred electrode when used to measure the concentration of various ions.

My present electrode is based on a discovery that was made while trying to find an electrode sensor phase which would be capable of measuring bicarbonate in the presence of chloride. The results of that earlier work now form a significant portion of my copending patent application Ser. No. 222,023. During the work that led to that patent application, it was noted that better chloride over bicarbonate selectivity could be realized if the chloride ion exchanger is dissolved in a solvent consisting of either 2,2,2 - trifluoroethyldeconate or 1-phenyl - 1 - heptanol. When the above solvents were used, it was found that, surprisingly, the selectivity of chloride over bicarbonate was significantly higher than when the known decanol solvent was used. In addition, it was noted that the response times, stabilities, and repeatabilities and the slopes of chloride responses were equal to or better than those of the decanol solvent. It should be pointed out, however, that although the above ester, when used as a solvent, produced an electrode with very desirable selectivity characteristics, the ester was somewhat difficult to work with because it has an offensive, foul odor. Thus, even though the examples below clearly show an increased chloride over bicarbonate selectivity when either 1-phenyl-1-heptanol or 2,2,2-trifluoroethyldeconate is used as a solvent for a typical chloride exchange such as tri-n-octylpropylammonium chloride (TOPACL), the 1-phenyl-1-heptanol is my preferred solvent.

Since the primary objective of this invention is to provide an organic ion-exchange sensor phase which measures the concentration of chloride in varying amounts of bicarbonate it is thought that the steps needed to construct the actual housing of the sensor phase need not be described in detail. Such housings are well known and do not form, in themselves, a basis for the present invention. Examples of how to actually construct and use the electrodes may be found in U.S. Pat. No. 3,429,785 and U.S. Pat. No. 3,448,032 both assigned to the same assignee as the present invention. The actual construction and use of such electrodes, as described in the above patents, is incorporated herein by reference.

The above-described housing for electrodes for liquid organic ion-exchange materials also include internal reference electrodes which are in electrical contact with the liquid organic ion-exchange sensor phase. Such internal reference electrodes are well known, as shown in the above patents, and they do not constitute a part of the present invention. My present sensor phases need only replace the sensor phases contained by known electrode housings.

In the experiments below the prepared sensor electrodes were used with a standard reference electrode which is well known in the art. The actual type of reference electrode used was a fiber-junction saturated KCl calomel electrode.

All test solutions described below were prepared by using analytical reagent grade salts and twice distilled water.

It should be pointed out that there are a number of chloride ion sensing salts (quaternary ammonium salts) that can be used with my solvent system. It is important, however, that the quaternary ammonium salts which are sensitive to the chloride ions have a sufficiently high viscosity such that there occurs minimal sensor-to-test solution leakage. Generally, to achieve such a viscosity, alkyl groups on the quaternary ammonium salts are chosen so that the quaternary ammonium salt has a total molecular weight of greater than about 200. The upper viscosity limitation is based on practical considerations, e.g., a very high viscosity (high molecular weight) makes it difficult to work with the salt and construct the electrode. Examples of such salts which can be used are tri-n-octylpropyl ammonium carbonate, tri-n-octylpropylammonium chloride, tri-n-octylpropylammonium acetate, and other salts which are known in the art to be sensitive to chloride ion activity. My preferred chloride ion sensing salt is tri-n-octylpropylammonium chloride, and that salt is used in the examples below.

The tri-n-octylpropylammonium chloride was prepared from the corresponding bromide salt in the following manner: 25 grams of a bromide salt was dissolved in 400 ml. of absolute methanol. The solution was stirred vigorously while slowly adding 12.5 grams of powdered silver chloride. The stirring was continued for an additional hour. The solution was then filtered through a No. 40 filter paper and placed in a 500 ml. round bottom flask. The excess solvent was removed with a Rinco evaporator attached to a water aspirator. The residue was transferred to a 125 ml. separatory funnel with warm hexane and extracted three times with 75 ml. portions of hexane. The chloride salt was filtered through a glass-wool plug and placed in a 200 ml. round-bottomed flask. The flask was attached to the evaporator, connected to a water aspirator. When the bubbling ceased, the evaporator was attached to a hard vacuum for 12 hours to remove the last traces of hexane. The flask was then heated to 60° C. in an oven to facilitate removal of the product for storage inside a brown bottle.

In the examples below, the expression "weight/volume" or "wt./vol." is used to designate the amount of sensing salt in a given solvent. Weight-in-volume solutions (wt./vol.) are defined by the U.S.P. as "the number of grams of an active constituent in 100 milliliters of solution" regardless of whether water or some other liquid is the vehicle. Thus, for example, the designation "10% wt./vol." is conveniently used to represent such solution strengths as 1.0 grams in 10 ml., 1.5 grams in 15 ml., 2.5 grams in 25 ml., 3.0 grams in 30 ml., 6.0 grams in 60 ml., 10 grams in 100 ml., and the like, the point being that the numerical value of grams is "10%" of the numerical value of the milliliters in which the quantity of grams is dissolved. Useful conversion tables for "percent wt./vol." solutions can be found in The Merck Index, Merck & Co., Inc., Rahway, N.J., Eighth Ed., p. 1280 (1968). That publication (at page 1280) also describes why such expressions as "percent wt./vol." are useful.

EXAMPLE I

My preferred complete sensor phase was prepared by dissolving a sufficient amount of the chloride salt in 1-phenyl-1-heptanol to effect a 10% weight/volume solution of the salt. Then the electrode was assembled in the usual manner using an Ag/AgCl internal reference electrode immersed in a saturated sodium chloride solution. The concentration of sensor salt to solvent may be between about 1 to about 20%, preferably about 10% by weight/volume. Generally, it has been found that the percentage of sensor salt to the solvent, on a weight/volume basis, depends greatly on the expected concentration of chloride ions in the test solution. For example, it is known that the sensor salt tends to contaminate the test solution. Therefore, if the expected chloride concentration in the test solution is very low, it is desirable to use as little sensor salt as possible so as not to contaminate a test solution with leakage of the sensor phase. However, to assure that the sensor phase will, in fact, sense chloride ions, the sensor salt should be at least 1%, by weight/volume, of the solvent. If, however, the expected chloride contamination of the test solution is higher, then, the expected contamination from the sensor salt would be expected to have less effect on the concentration of chloride ions in a test solution. Thus, a higher percentage of sensor salt, up to 20%, may be used. It has been found that the higher concentration of sensor salt in solvent generally tends to give a more stable electrode. Thus, to achieve more stability and a minimal amount of contamination, it has been found that a preferred concentration of sensor salt to solvent is about 10% by weight/volume.

When the 1-phenyl-1-heptanol was used as a solvent for the tri-n-octylpropylammonium chloride, and that sensor system was used in preparing electrodes, the selectivity for chloride over bicarbonate was found to be about 10:1. This results in a smaller effect on the EMF of the system for a given change in bicarbonate concentrations. Experimental results showed that the change in the EMF was reduced to 1.8 mv. in aqueous systems containing from 10 to 50 milliequivalents of sodium bicarbonate and 0.1 molar sodium chloride. The sensor electrode with the 1-phenyl-1-heptanol can be employed in electrodes where a cellophane membrane is placed between the sensor and the test solution without noticeably affecting the operating characteristics of the electrode. This helps prevent escape of the sensor from the electrode and it is especially important in multiple electrode systems where more than one liquid ion exchange electrode is used.

Figure 2:
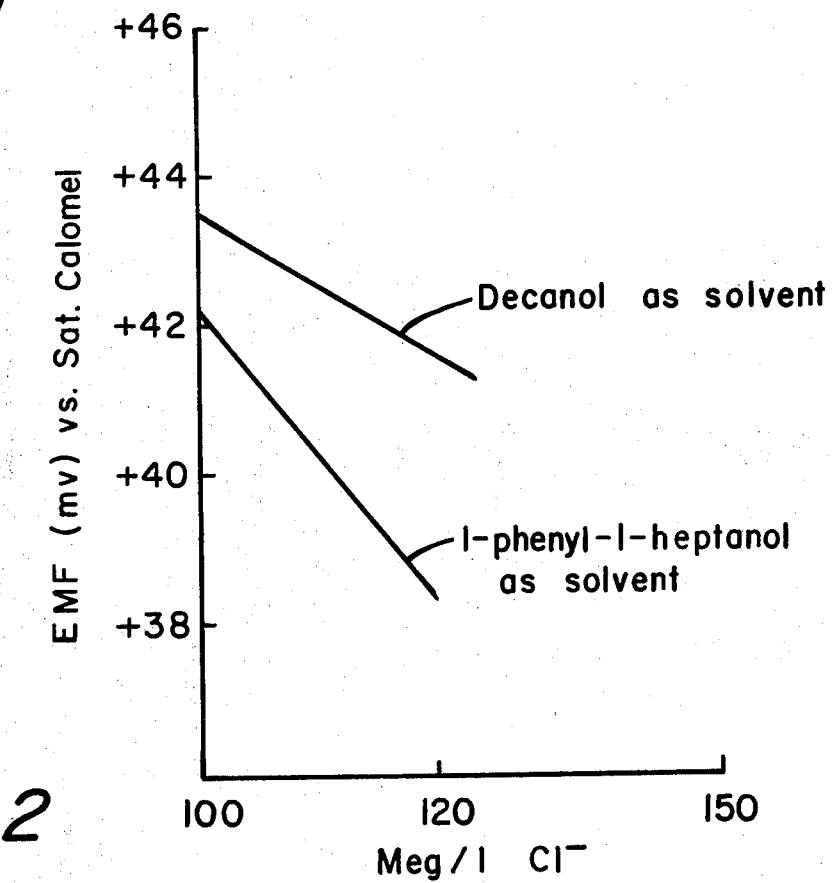
FIG. 2 is a graph comparing the response of my electrode with a known commercially available chloride sensing electrode in the presence of bicarbonate.

FIG. 1 shows the response curves for the above-described electrode which were made by inserting the complete sensor phase into the electrode housing similar to that described by FIG. 2 of U.S. Pat. No. 3,448,032. The general order of selectivity for various anions, when compared with the presently available electrode which uses a decanol solvent, has not been changed. Also, in solutions containing 100 mg./l. per liter chloride, this sensor is not affected by changes in hydroxide concentrations between pH 3 and pH 11, and this compares favorably with the performance of the older sensor using decanol as a solvent.

FIG. 2 compares the selectivities of the present electrode sensor phase with that sensor phase using decanol as a solvent. As noted above, the older sensor phase having a selectivity of chloride over bicarbonate of about 4:1. In our electrode, it can be seen that this selectivity is increased to about 10:1. Thus, the present electrode will give more reliable results in test solutions of chloride ions which contain varying amounts of bicarbonate ions.

As can be seen from FIG. 2 there appears to be a significant difference in the slopes of both electrodes, indicating the increased selectivity. The electrode's response was found to be rapid and with excellent long term stability. This represents a dramatic improvement over existing sensor material, and this improvement is attributable to the 1-phenyl-1-heptanol solvent system disclosed.

EXAMPLE II

Another electrode was prepared as in Example I but with a solvent consisting of 2,2,2-trifluoroethyldeconate. The sensor phase of the electrode consisted of 10% TOPACL (wt./vol.) in the above ester and the chloride responses in single salt NaCl solutions are listed below.

TABLE

| NaCl (molarity): | EMF (vs. saturated calomel), mv. |
|---|---|
| $10^{-4}$ | +198.6 |
| $10^{-3}$ | +155.6 |
| $10^{-2}$ | +100.6 |
| $10^{-1}$ | +46.3 |

In a solution of $10^{-2}$ M $NaHCO_3$, the EMF is +150.0 mv. As can be seen in the table, the Cl⁻ response of the electrode using the ester as solvent for the TOPACL is about 50 mv. more negative than in a solution containing the same concentration of $NaHCO_3$. Thus, even with this less preferable sensor system, the selectivity for Cl⁻ over $HCO_3^-$ is almost double that previously obtained in the commercially available electrode employing decanol as a solvent.

It should be pointed out that in the past one of the major inconsistencies found in using past chloride sensing electrodes was the large change in calibration of the chloride electrode between aqueous samples and blood serum. A significant part of this change was found attributable to the bicarbonate response (caused by the chloride shift) of the chloride electrode. Although past results achieved in using the chloride electrode were fairly reproducible, it is felt that the reproducibiilty was based mainly on the fact that most bicarbonate values fall within a very narrow range. However, presence of bicarbonate ion concentration fluctuations in serum did lead to a considerably reduced electrode slope, thus tending to result in the reduced accuracy. With the present electrode, the accuracy is significantly improved.

As has been pointed out above, the actual construction of the housing for my new sensor phase does not form a part of the present invention. Such housings, and their related internal reference electrodes, are well known. Likewise, the standard reference electrode which may be used includes those reference electrodes which are well known and used in the art, e.g., a saturated calomel reference electrode.

Since the above-described sensor phases are subject to modifications without departing from the scope of the present invention, it is intended that the present invention should be limited only by the appended claims.

I claim:

1. An improved electrode for measuring concentration of chloride ions in the presence of bicarbonate ions in an aqueous test solution and comprising in combination (a) a chloride ion sensing phase comprising a quaternary ammonium salt sensitive to chloride ions;
   (b) a solvent system for the salt of (a) selected from the group consisting of 1-phenyl-1-heptanol and 2,2,2-trifluoroethyldeconate, the concentration of the salt of (a) in the solvent of (b) being between about 1 to about 20% by wt./vol.;
   (c) means for containing the sensor phase of (a) in the solvent system of (b) so as to provide an interface for ion exchange contact between the materials so contained and the aqueous test solution; and
   (d) an internal reference electrode in electrical contact with the materials contained by (c).

2. The electrode, as claimed in claim 1, wherein the materials contained by (c) comprise tri-n-octylpropylammonium chloride in 1-phenyl-1-heptanol.

3. The electrode, as claimed in claim 2, wherein the wt./vol. is about 10%.

References Cited
UNITED STATES PATENTS

| | | | |
|---|---|---|---|
| 3,429,785 | 2/1969 | Ross | 204—195 L |
| 3,448,032 | 6/1969 | Settzo et al. | 204—195 J |

TA-HSUNG TUNG, Primary Examiner

U.S. Cl. X.R.

204—1T